(12) United States Patent
Johnston et al.

(10) Patent No.: US 6,596,832 B2
(45) Date of Patent: Jul. 22, 2003

(54) POLYMER COMPOSITIONS USEFUL AS FLOW IMPROVERS IN COLD FLUIDS

(75) Inventors: Ray L. Johnston, Ponca City, OK (US); Stuart N. Milligan, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/256,762

(22) Filed: Sep. 27, 2002

(65) Prior Publication Data

US 2003/0069330 A1 Apr. 10, 2003

Related U.S. Application Data

(60) Provisional application No. 60/326,327, filed on Oct. 1, 2001.

(51) Int. Cl.[7] ............... C08F 212/06; C08F 210/14; C08F 2/02
(52) U.S. Cl. ............ 526/347; 526/348.2; 526/348.3; 526/348.6; 526/903; 526/916; 524/578; 524/579; 523/175; 523/309; 137/13
(58) Field of Search ............... 526/348.2, 348.3, 526/348.6, 347, 903, 916; 524/578, 579; 523/175, 309; 137/13

(56) References Cited

U.S. PATENT DOCUMENTS

| | | | |
|---|---|---|---|
| 3,692,676 A | 9/1972 | Culter et al. | 252/8.55 R |
| 4,340,076 A | 7/1982 | Weitzen | 137/13 |
| 4,518,757 A | 5/1985 | Schulz et al. | 526/329 |
| 4,527,581 A * | 7/1985 | Motier | 526/348.6 X |
| 4,797,461 A * | 1/1989 | Aubanel et al. | 526/348.6 |
| 6,162,773 A | 12/2000 | Eaton et al. | 508/591 |
| 2001/0002389 A1 * | 5/2001 | Eaton et al. | 526/348.3 X |

* cited by examiner

Primary Examiner—Fred Teskin
(74) Attorney, Agent, or Firm—ConocoPhillips Company

(57) ABSTRACT

A drag-reducing polymer capable of dissolving even in cold fluids is described, along with a method for manufacturing said drag-reducing polymer. The drag-reducing polymer has at least one alpha-olefin monomer with between a four and nine carbon chain length and a co-monomer and has less than 25% monomers (molar content) with carbon chain lengths of 12 or longer. A drag-reducing polymer suspension is also described.

30 Claims, 1 Drawing Sheet

POLYMER COMPOSITIONS USEFUL AS FLOW IMPROVERS IN COLD FLUIDS

RELATED APPLICATIONS

This application is a conversion of U.S. Provisional Application Ser. No. 60/326,327 entitled "Polymer Compositions Useful as Flow Improvers in Cold Fluids" by Stuart N. Milligan, et al., that was filed on Oct. 1, 2001.

FIELD OF THE INVENTION

The present invention relates to drag-reducing polymers and their method of manufacture. More specifically, this invention relates to a method for preparing ultra-high molecular weight, hydrocarbon-soluble polymers capable of dissolving even in cold fluids.

BACKGROUND OF THE INVENTION

A drag-reducing agent is one that substantially reduces the friction loss that results from the turbulent flow of a fluid. Where fluids are transported over long distances, such as in oil and other hydrocarbon liquid pipelines, these friction losses result in inefficiencies that increase equipment and operations costs. Ultra-high molecular weight polymers are known to function well as drag-reducing agents, particularly in hydrocarbon liquids. In general, drag reduction depends in part upon the molecular weight of the polymer additive and its ability to dissolve in the hydrocarbon under turbulent flow. Effective drag-reducing polymers typically have molecular weights in excess of five million.

Drag-reducing polymers are known in the art. Representative, but non-exhaustive, samples of such art are: U.S. Pat. No. 3,692,676, which teaches a method for reducing friction loss or drag for pumpable fluids through pipelines by adding a minor amount of a high molecular weight, non-crystalline polymer; and U.S. Pat. No. 3,884,252, which teaches the use of polymer crumb as a drag-reducing material. These materials are extremely viscoelastic, and, in general, have no known use other than as drag-reducing materials. However, the very properties that make these materials effective as drag-reducing additives make them difficult to handle because they have a severe tendency to cold flow and reagglomerate even at subambient temperatures. Under conditions of pressure, such as stacking or palleting, cold flow is even more intense and reagglomeration occurs very quickly.

The general propensity of non-crosslinked elastomeric polymers (elastomers) to cold flow and agglomerate is well-known. Polymers of this sort cannot be pelletized or put into discrete form and then stored for any reasonable period of time without the materials flowing together to form large agglomerates. Because of such difficulties, elastomers are normally shipped and used as bales of rubber. However, such bales must be handled on expensive equipment and cannot be pre-blended. In addition, polymers such as the drag-reducing additives described are not susceptible to such balings, since cold flow is extremely severe. Further, dissolution time for such drag-reducing materials from the bulk polymer state in the flowing hydrocarbons to a dissolved state is so lengthy as to severely reduce the effectiveness of this material as a drag-reducing substance.

Numerous attempts have been made to overcome the disadvantages inherent in cold-flowing polymers. Representative, but non-exhaustive, of such art is that described in U.S. Pat. No. 3,791,913, wherein elastomeric pellets are surface cured, i.e., vulcanized to a minor depth in order to maintain the unvulcanized interior of the polymer in a "sack" of cured material, and U.S. Pat. No. 4,147,677, describing a method of preparing a free-flowing, finely divided powder of neutralized sulfonated elastomer by admixing with fillers and oils. This reference does not teach a method for making free-flowing powders of non-elastomeric material. U.S. Pat. No. 3,736,288 teaches solutions of drag-reducing polymers in normally liquid vehicles for addition to liquids flowing in conduits. A "staggered dissolution" effect is provided by varying the size of the polymer particles. Suspension or surface-active agents can also be used. While directed to ethylene oxide polymers, the method is useful for hydrocarbon-soluble polymers as well. U.S. Pat. No. 4,088,622 describes a method of making an improved, molded drag-reducing coating by incorporating antioxidants, lubricants, and plasticizers and wetting agents in the form of a coating which is bonded directly onto the surface of materials passing through a liquid medium. U.S. Pat. No. 4,340,076 teaches a process for dissolving ultra-high molecular weight hydrocarbon polymer and liquid hydrocarbons by chilling to cryogenic temperatures comminuting the polymer formed into discrete particles and contacting these materials at near cryogenic temperatures with the liquid hydrocarbons to more rapidly dissolve the polymer. U.S. Pat. No. 4,341,078 immobilizes toxic liquids within a container by injecting a slurry of cryogenically ground polymer particles while still at cryogenic temperatures into the toxic liquid. U.S. Pat. No. 4,420,440 teaches a method for collecting spilled hydrocarbons by dissolving sufficient polymer to form a nonflowing material of semi-solid consistency by contacting said hydrocarbons with a slurry of cryogenically comminuted ground polymer particles while still at cryogenic temperatures.

Some current drag-reduction systems inject a drag-reducing polymer solution containing a high percentage of dissolved, ultra-high molecular weight polymer into conduits containing the hydrocarbon. Another way to introduce ultra-high molecular weight polymers into the flowing hydrocarbon stream is through a suspension. Powdered ultra-high molecular weight polymers are suspended in a liquid that will not dissolve or will only partially dissolve the ultra-high molecular weight polymer. This suspension is then introduced into the flowing hydrocarbon stream.

Polyalphaolefin drag-reducing polymers, when produced in bulk polymerization processes or when reduced to high solids content, such as when precipitated from solution, can exhibit regions within the polymer which have a high level of order. These regions of high order, including phenomenon such as crystallinity, are often a very small fraction of the overall polymer. However, these regions may have a dramatic effect on the ability to dissolve the drag-reducing polymer. The regions of high order act somewhat like knots in a ball of yarn and are much slower to solvate and dissolve when the drag-reducing polymer is mixed into the hydrocarbon. These regions of high order may be increased by cryogenic processing, such as in cyrogenic grinding. The regions of high order may also increase during cold storage of the polymers.

What is needed is a drag-reducing polymer which exhibits very little or no regions of high order in the solid state. Further, these regions should not return during cold storage.

SUMMARY OF THE INVENTION

Accordingly, a drag-reducing polymer and drag-reducing polymer suspension and method of manufacturing the drag-reducing polymer suspension are disclosed herein. One embodiment of the present invention is drawn to an ultra-high molecular weight copolymer comprising an alpha-olefin monomer with carbon chain lengths of between four and nine carbons and having less than 25% monomers with carbon chain lengths of twelve carbons or longer. The ultra-high molecular weight copolymer has a molecular weight of greater than 1 million and should have substantially no reluctant fraction as measured by the Cold-Shear Warm Filtration Test.

In another embodiment, a method of manufacturing an ultra-high molecular weight copolymer is disclosed. A mixture of an ultra-high molecular weight copolymer comprising an alpha-olefin monomer with a carbon chain length of between four and nine carbon atoms and having less than 25% monomers with carbon chain lengths of twelve or longer is bulk polymerized to form the ultra-high molecular weight copolymer. The ultra-high molecular weight copolymer has a molecular weight of greater than 1 million. In still another embodiment, a method of preparing a drag-reducing copolymer suspension is disclosed where the ultra-high molecular weight copolymer is manufactured by bulk polymerizing a monomer mixture composed of a majority of alpha-olefin monomers with carbon chain lengths of between 4 and 9 carbons and less than 25% monomers with carbon chain lengths of twelve or longer, wherein the ultra-high molecular weight copolymer has a molecular weight of greater than 1 million and substantially no reluctant fraction, and then mixing the ultra-high molecular weight copolymer with a suspending fluid. An initiator, catalyst and promoter are then added and the mixture allowed to react to form the ultra-high molecular weight copolymer. The ultra-high molecular weight copolymer has a molecular weight of greater than 1 million.

In still another embodiment of the present invention, a method for the preparation of a drag-reducing copolymer suspension is disclosed where an ultra-high molecular weight copolymer is prepared by solution copolymerization of a monomer mixture composed of a majority of alpha-olefin monomers with carbon chain lengths of between 4 and 9 carbons and less than 25% monomers with carbon chain lengths of twelve or longer, wherein the ultra-high molecular weight copolymer has a molecular weight of greater than 1 million and substantially no reluctant fraction, separating the ultra-high molecular weight copolymer from the hydrocarbon solvent and then mixing the ultra-high molecular weight copolymer with a suspending fluid. The ultra-high molecular weight copolymer may be ground at a temperature below the glass-transition temperature of the ultra-high molecular weight copolymer to form ground polymer particles prior to mixing the copolymer with the suspending fluid.

One advantage of the present invention is that the drag-reducing polymer suspension is easily transportable and does not require pressurized or special equipment for storage, transport, or injection. Another advantage is that the drag-reducing polymer is quickly dissolved in various flowing hydrocarbon streams. Yet another advantage is that the copolymers of the present invention are fully soluble in heavy aromatic hydrocarbons at temperatures as low as 0° C. (32° F.). Another advantage of copolymers of the present invention is that they may either be transported in a stable suspension, or pre-dissolved in a small amount of heavy hydrocarbon. Still another advantage of the present invention is that reagglomeration of the drag-reducing polymers is greatly reduced, allowing for easier handling during manufacture. Another advantage of the present invention is that the drag-reducing polymer suspension is stable, allowing a longer shelf life and balancing of customer demand with manufacturing time.

DETAILED DESCRIPTION OF THE INVENTION

Figure 1:
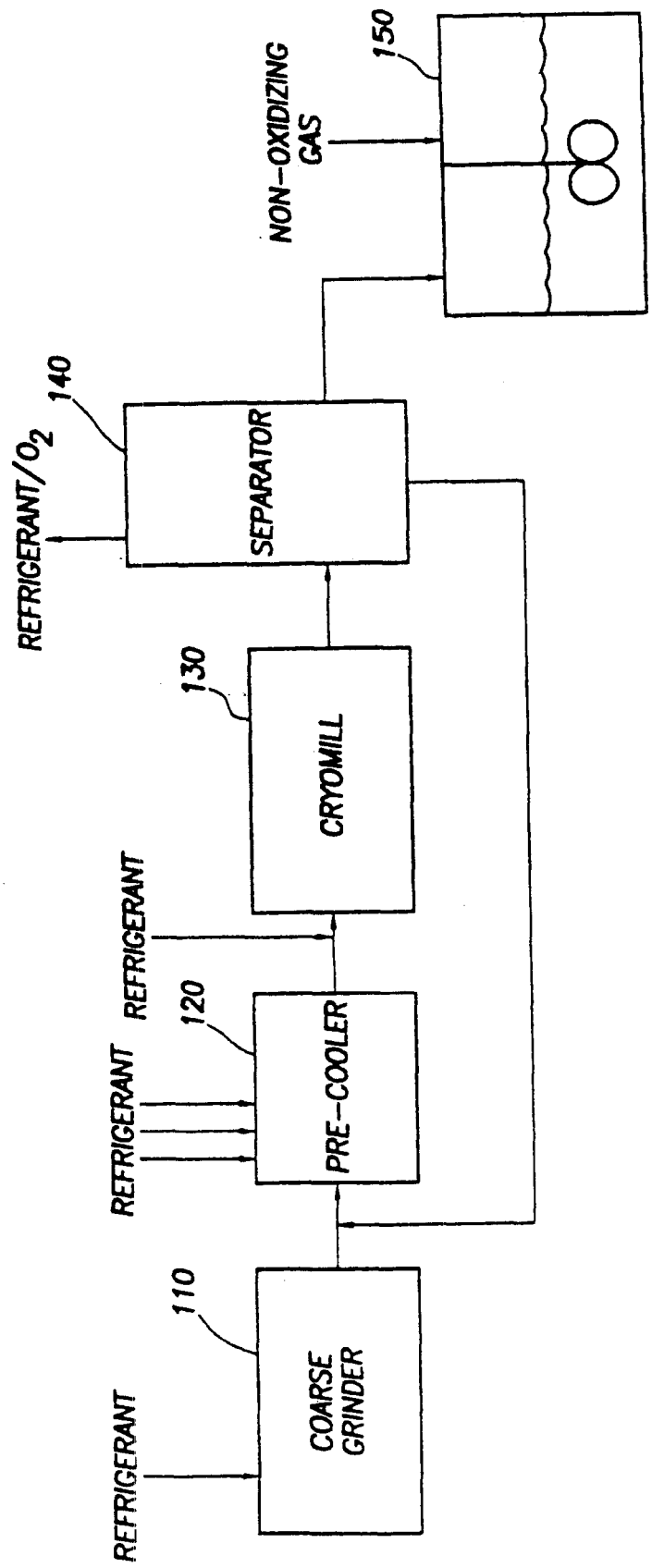
FIG. 1 is a schematic of the apparatus for manufacturing the drag-reducing polymer suspension.

Polymers with high-order regions can manifest a reluctance to dissolve in certain hydrocarbons, particularly when the hydrocarbon is cold, i.e., less than about 13° C. (55° F.). Any portion of a drag-reducing polymer that does not readily dissolve in a hydrocarbon is termed "reluctant fraction" because of its reluctance to enter solution. This reluctant fraction is typically much less than 1% of the drag-reducing polymer, although it typically has a disproportional negative effect in the pipeline terminal handling of the hydrocarbon. Because the reluctant fraction does not dissolve in a desirable time period, it will pass through pipeline shear points without being reduced in molecular weight by shear degradation. Further, because the reluctant fraction retains its ultra-high molecular weight, it has the potential to exhibit Extensional Viscosity (EV) effects in pipeline filters. EV effects may cause high pressure drop across fine filters present in hydrocarbon transport piping. While the reluctant fraction is eventually sheared-down, that eventual shearing is often too late to ameliorate the filter pressure problems. Reluctant fraction effects are particularly noticeable in diesel fuels at temperatures below about 13° C. (55° F.).

In the present invention, drag-reducing polymers are disclosed that exhibit little or no reluctant fraction, hereinafter referred to as non-reluctant polymers. These non-reluctant polymers are copolymers having few if any monomers of twelve carbon chain length or longer, i.e., little or no fraction of dodecene or longer monomers. Typically, these copolymers have significantly less than 25% dodecene or longer monomers, preferably less than 15%, and most preferably less than 1%. It is preferred that these copolymers be formed from a majority of alpha-olefin monomers with a carbon chain length of between four and nine carbon atoms. The polymers may be formed with a minority fraction composed of other alpha-olefins with carbon chain lengths of between two and twenty carbons, but preferably formed from such monomers as ethylene, propylene, decene, undecene or vinyl aromatic monomers of any carbon number. Examples of the vinyl aromatic monomer include styrene, an alkyl-styrene with an alkyl group having between one and eighteen carbon atoms, a vinyl naphthalene, and a vinyl alkylnaphthalene with an alkyl group having between one and eighteen carbon atoms. Thus, some examples of acceptable non-reluctant copolymers include, but are not limited to: 80% octene/20% decene, 70% octene/30% decene, 90% octene/10% dodecene, and 70% octene/30% propylene (all molar ratios). The non-reluctant copolymers may be formed with more than two monomers, as long as the majority fraction is composed of alpha-olefin monomers having a carbon number between four and nine and little or no monomers with twelve or more carbons in the chain. Examples include, but are not limited to: 70% octene/20% decene/10% propylene, 60% octene/20% hexene/20% butene, 70% octene/20% decene/10% dodecene, 40% octene/30% hexene/30% decene, and 45% octene/45% hexene/10% styrene.

These polymers are most frequently formed through bulk polymerization, although those of skill in the art will appreciate that other methods are also acceptable, such as solution polymerization. When produced through bulk polymerization, the polymerization medium contains primarily catalyst and α-olefin monomers. Although some diluent hydrocarbons can be present, nearly all reactive monomers are normally reacted. The reaction medium will normally contain at least 80% reactive monomers by weight, and normally these monomers are nearly completely reacted, resulting in polymer contents of normally at least 80% by weight of the total reaction medium, based on the total reactor content. Preferably the monomers comprise at least 90% by weight of the total reaction medium, resulting in final polymer contents of normally at least 90% by weight of the total reaction medium, and most preferably the monomers comprise at least 95% by weight of the total reaction medium, resulting in final polymer contents of normally at least 95% by weight of the total reaction medium.

The bulk polymerizations of the present invention may be carried out using any alpha-olefin polymerization catalyst, but Ziegler-Natta catalysts are preferred. The Ziegler-Natta catalysts used can be any of those described in the art. Particularly useful materials are those described in U.S. Pat. Nos. 4,945,142, 4,358,572, 4,371,455, 4,415,714, 4,333,123, 4,493,903 and 4,493,904, which are hereby incorporated by reference. Appropriate metallocene catalysts may also be used. In bulk polymerization systems, catalysts are used typically at a concentration of 3500 moles monomer per mole transition metal halide in the catalyst, although ratios can vary from as low of 500/1 to as high as 10000/1 or more. Catalyst concentration affects rate of reaction and temperature as well as molecular weight. These catalysts often are more effective when used in the presence of a promoter, such as dibutyl ether, or an initiator, such as diisobutyl aluminum chloride (DIBAC).

For polymerization reactions that are incomplete, removal of unreacted monomers is advantageous and may be carried out by vacuum drying and/or vacuum drying with precipitation according to well-known techniques. However, it is preferred that a bulk reaction simply be carried out to substantial completion, preferably to 99% completion or more, and that the drying step to remove monomer and/or solvent be avoided whenever possible.

Bulk polymerization reactions of this invention are exothermic reactions. It is preferred and sometimes even necessary to control the heat transfer and/or temperature rise in bulk polymerizations in order to obtain ultra-high molecular weights (inherent viscosity) required for best drag reduction. In a typical experiment, the catalyst and monomers are combined in a reaction vessel and agitated at ambient conditions for a period of time sufficient to increase viscosity of the reaction mixture sufficiently to suspend the catalyst and then placed into a cool environment to allow the reaction to proceed. The cool environment is normally maintained at a temperature from about −20° C. to about 25° C. (about −4° F. to about 80° F.), allowing the reaction to proceed at a relatively constant pace, while removing heat and forming high molecular weight polymers. Conversions of more than 95% can be obtained, with 99% preferred. Depending on the monomers and catalyst used and reaction conditions, reaching such conversion levels may require longer reaction times, typically in the range of from about one hour to several days.

The polymers of this invention can also be made by solution polymerization of the monomers followed by removal of the solvent. In solution polymerization, the hydrocarbon solvent, catalyst, and monomers are combined in a reaction vessel and agitated under a nitrogen atmosphere at ambient pressure. It may be necessary to cool the reaction vessel either prior to the reaction or during the reaction, depending on the equipment used, conversion desired, and concerns over polymeric degradation. As the solution becomes viscous, the agitation is discontinued and the reaction is allowed to proceed to greater than 50% conversion, preferably greater than 95% conversion, and most preferably greater than 99% conversion. After the completion of the polymerization, the polymer solution may be contacted with a non-solvent to precipitate the polymer and extract the polymerization solvent and unreacted monomer, for example, as is taught by Johnston, et. al. in U.S. Pat. No. 5,376,697. The resulting polymer may then be dried. Alternatively, if the hydrocarbon solvent boils at a low temperature, it can be removed by heating, exposure to vacuum, or both. Combinations of extraction by a non-solvent, heating and/or vacuum may be used as should be apparent to one skilled in the art.

To be an effective drag-reducing agent within the scope of this invention, the polymer should have a molecular weight in excess of 1 million and preferably in excess of 5 million.

The presence of reluctant fraction can be determined through a number of methods. For example, the polymer may be examined through Differential Scanning Calorimetry ("DSC"). Polymers containing reluctant fraction will most often have endothermic peaks at 21 to 31° C. in a scan beginning below 0° C. DSC is an indicative test only in that the presence of an endothermic peak as described is sufficient to indicate the presence of a reluctant fraction, but absence of such endothermic peaks does not guarantee the absence of a reluctant fraction. The existence of a reluctant fraction may be more definitively shown through a Cold Shear-Warm Filtration test. For instance, in one test method, a cold hydrocarbon, such as diesel, may be combined with a small amount of drag-reducing polymer suspension and agitated to achieve complete mixing and near-complete dissolution of the non-reluctant fraction portion. This mixture is then sheared while still cold and warmed to further facilitate dissolution of any reluctant polymer. This mixture is then filtered through a small micron filter (typically less than 10 microns and often about 5 microns or less). The filtration rate is measured and compared with the untreated hydrocarbon. A difference of greater than about 20% indicates the presence of reluctant fraction. A more detailed description of the Cold Shear-Warm Filtration test is given in Example 2.

The ultra-high molecular weight copolymer of the present invention may be ground at temperatures below the glass-transition temperature of the polymer and then mixed in a carrier fluid. Glass-transition temperatures vary with the type of polymer and typically range between −10° C. to −100° C. (14° F. and −148° F.). This temperature can vary depending upon the glass-transition point of the particular copolymer, but normally such temperatures must be below the lowest glass-transition point of a polymer that comprises a polymer blend.

As shown in FIG. 1, the ultra-high molecular weight polymer is conveyed to coarse grinder 110. Coarse grinder 110 chops large chunks of copolymer into small polymer pieces, typically between 1¼ to 1½ centimeters (½" to ⅝") in diameter. While coarse chopper 110 may be operated at ambient temperatures, it is preferable to cool the polymer in coarse chopper 110 to between 5° C. to 15° C. (41° F. to 59° F.). The polymer in coarse chopper 110 may be cooled either internally or externally, or both, with a liquid, gaseous, or solid refrigerant, or a combination thereof, but most commonly by spraying a liquid refrigerant into coarse chopper 110, such as liquid nitrogen, liquid helium, liquid argon, or a mixture of two or more such refrigerants.

The small polymer pieces formed in coarse chopper 110 are then transported to pre-cooler 120. This transport may be accomplished by any number of typical solids handling methods, but is most often accomplished through the use of an auger or a pneumatic transport system. Pre-cooler 120 may be an enclosed screw conveyor with nozzles for spraying a liquid refrigerant, such as liquid nitrogen, liquid helium, liquid argon, or mixtures thereof onto the small polymer pieces. While a gaseous refrigerant may also be used alone, the cooling efficiency is often too low. Pre-cooler 120 reduces the temperature of the small polymer pieces to a temperature below the glass-transition temperature of the polymer. This temperature is preferably below −130° C. (−202° F.), and most preferably below −150° C. (−238° F.). These temperatures may be produced by any known methods, but use of liquid refrigerant such as that consisting essentially of liquid nitrogen, helium, argon, or a mixture of two or more such refrigerants sprayed directly onto the polymer is preferred as the resulting atmosphere reduces or eliminates flammability hazards that exist when polymer particles are mixed with an oxygen-containing atmosphere. The rate of addition of the liquid refrigerant may be adjusted to maintain the polymer within the preferred temperature range.

After the small polymer pieces are cooled in pre-cooler 120, they are transported to cryomill 130. Again, this transport may be accomplished by any typical solids handling method, but often by an auger or a pneumatic transport system. A liquid refrigerant may be added to cryomill 130 in order to maintain the temperature of the polymer in cryomill 130 below the glass-transition temperature of the ultra-high molecular weight polymer. In one embodiment of the invention, this liquid refrigerant is added to the small polymer pieces at the entrance to cryomill 130. The temperature of the cryomill must be kept at a temperature below the glass-transition temperature. It is preferable to maintain the temperature of the cryomill between −130° C. to −155° C. (−202° F. to −247° F.). Cryomill 130 may be any of the types of cryomills known in the art, such as a hammer mill or an attrition mill. Cryomill 130 acts to reduce the particle size of small polymer pieces it receives from pre-cooler 120.

The particles formed in cryomill 130 are then transferred to separator 140. Most of the liquid refrigerant vaporizes in separator 140. Separator 140 acts to separate the primarily vaporized refrigerant atmosphere from the solid polymer particles, and the larger polymer particles from the small polymer particles. Separator 140 may be any known separator suitable for separating particles of this size, including a rotating sieve, vibrating sieve, centrifugal sifter and a cyclone separator. Separator 140 vents a portion of the primarily vaporized refrigerant atmosphere from cryomill 130, and separates particles into a first fraction with less than a set minimum diameter from a second fraction having diameters higher than the set minimum diameter. The second fraction of those particles of having diameters higher than the set minimum diameter is discarded or preferably returned for recycle purposes to the pre-cooler for re-grinding. The first fraction of those particles of having diameters lower than the set minimum diameter is then transported to mix tank 150. A person of ordinary skill in the art will be able to select the proper set minimum diameter, which may depend upon the separator, operating conditions, and desired end use, to optimize the final suspension properties.

The small polymer particles (first fraction) are mixed with a suspending fluid in mix tank 150 to form a suspending fluid/polymer particles mixture. The suspending fluid is any liquid that is a non-solvent for the ultra-high molecular weight polymer. Water is most commonly used. For many other mixtures, lower carbon alcohols such as methanol, ethanol or their mixtures, with or without water, may also be used as the suspending fluid. Mix tank 150 acts to form a suspension of the polymer particles in the suspending fluid. Other components may be added to the mix tank before, during, or after mixing the ground polymer particles with the suspending fluid in order to aid the formation of the suspension, and/or to maintain the suspension. For instance, glycols, such as ethylene glycol or propylene glycol, may be added for freeze protection or as a density balancing agent. The amount of glycol added may range from 10% to 60% by weight of the suspending fluid, as needed. A suspension stabilizer may be used to aid in maintaining the suspension of the ultra-high molecular weight, non-tacky polymer particles. Typical suspension stabilizers include talc, tri-calcium phosphate, magnesium stearate, silica, polyanhydride polymers, sterically hindered alkyl phenol antioxidants, amide waxes such as stearamide, ethylene bis-stearamide and oleamide, and graphite. The amount of the suspension stabilizer may be minimized or eliminated where possible to reduce the amount of material in the suspension that does not act as a drag-reducing agent. The amount of the suspension stabilizer added may range from 0% to 40% of the suspending fluid, by weight, but is preferably between 5% and 25%, most preferably between 8% and 12%. A wetting agent, such as a surfactant, may be added to aid in the dispersal of the polymer particles to form a uniform mixture. Non-ionic surfactants, such as linear secondary alcohol ethoxylates, linear alcohol ethoxylates, alkylphenol ethoxylates and anionic surfactants such as alkyl benzene sulfonates and alcohol ethoxylate sulfates, e.g., sodium lauryl sulfate, are preferred. The amount of wetting agent added may range from 0.01% to 1% by weight, but is preferably between 0.01% and 0.1%. In order to prevent foaming of the suspending fluid/polymer particle mixture during agitation, a suitable antifoaming agent may be used, typically a silicon oil based commercially available antifoam. Representative but non-exhaustive examples of antifoaming agents are antifoam agents, trademark of, and sold by, Dow Corning, Midland, Mich.; and Bubble Breaker products, trademark of, and sold by, Witco Chemical Company, Organics Division. Generally, no more than 1% of the suspending fluid by weight of the active antifoaming agent is used. Mix tank 150 may be blanketed with a non-oxidizing gas such as nitrogen, argon, neon, carbon dioxide, and carbon monoxide, or other similar gases, or the non-oxidizing gas may be sparged into mix tank 150 during polymer particle addition to reduce the hazard of fire or explosion resulting from the interaction between the small polymer particles.

After the suspending fluid/polymer particle mixture is agitated to form a uniform mixture, a thickening agent may be added to increase the viscosity of the mixture. The increase in viscosity retards separation of the suspension. Typical thickening agents are high molecular weight, water-soluble polymers, including polysaccharides, xanthum gum, carboxymethyl cellulose, hydroxypropyl guar, and hydroxyethyl cellulose. Where water is the suspending fluid, the pH of the suspending fluid should be basic, preferably above 9 to inhibit the growth of microorganisms.

The product resulting from the agitation in the mix tank is a stable suspension of a drag-reducing polymer in a carrier fluid suitable for use as a drag-reducing agent. This suspension may then be pumped or otherwise transported to storage for later use, or used immediately.

EXAMPLE 1

A catalyst was prepared by combining, in a primarily nitrogen environment under ambient temperature and pressure, 2.92 grams of TiCl3.AA with 23.07 grams of purified petroleum distillate, together with 2.05 grams of dibutyl ether promoter according to the teachings of Mack U.S. Pat. No. 4,416,714. The solution was held for 30 minutes while stirring. The catalyst was then activated using 20.71 grams of an aluminum cocatalyst, a 25% solution of diisobutyl aluminum chloride (DIBAC) in heptane solvent ("25% DIBAC solution"). Again, the mixture was held for 30 minutes while stirring. An octene-decene copolymer was prepared in a primarily nitrogen environment under standard temperature and pressure by mixing 381.2 grams of octene with 119.0 grams of decene in a beaker. After stirring, 4.0 milliliters of a 25% DIBAC solution was added to the beaker. The mixture was held for 30 minutes without stirring. A 3.0 milliliter portion of the catalyst mixture prepared was added to the beaker while stirring continuously. The entire mixture was allowed to react. The subsequent copolymer was subsequently tested and found to have a 95.53% conversion to polymer with an inherent viscosity of 27.8 deciliters/gram.

EXAMPLE 2

A catalyst is prepared by combining, in a primarily nitrogen environment under ambient temperature and pressure, 0.090 grams of TiCl3.AA with 1.0 milliliters of purified petroleum distillate, together with 83 microliters of dibutyl ether promoter according to the teachings of Mack U.S. Pat. No. 4,416,714. The solution is held for 30 minutes while stirring. The catalyst is then activated using 0.89 milliliters of an aluminum cocatalyst, a 25% solution of diisobutyl aluminum chloride (DIBAC) in heptane solvent ("25% DIBAC solution"). Again, the mixture is held for 30 minutes while stirring. An octene-decene copolymer is prepared in primarily nitrogen environment under standard temperature and pressure by mixing 572 ml of purified petroleum distillate, 42.9 milliliters of 1-octene, and 5.7 milliliters of 1-decene in a beaker. After stirring, 3.3 milliliters of a 25% DIBAC solution is added to the solvent and mixed olefins in the beaker. The mixture is held for 30 minutes with stirring. The entire 1.0 milliliter of catalyst mixture prepared is added to the beaker while the contents are being stirred. The entire mixture is allowed to react and as the solution becomes viscous, the agitation is discontinued. The copolymer is subsequently tested. Conversion to polymer is greater than 95% and the inherent viscosity is sufficient for good drag reduction.

The resulting copolymer solution is subjected to precipitation, extraction, drying, cryogenic grinding, and suspension in an alcohol mixture as taught by Johnston, et. al. in U.S. Pat. No. 5,376,697. The octene-decene copolymer solution is pumped through a small diameter tube into a large bucket of isopropyl alcohol equipped with a mechanical stirrer. The stirring is continued intermittently for 3 days, at the end of which time, the solid polymer is isolated by filtration. The polymer pieces are spread out in a tray and are air dried to remove isopropyl alcohol. When free of alcohol, the polymer pieces are transferred to a vacuum oven and dried at about 160° F. under vacuum for several hours. The polymer pieces are then cryogenically ground and prepared as 25 wt % polymer suspensions in an isooctyl alcohol/propylene glycol mix.

EXAMPLE 3

A polymer composition was prepared in accordance with Example 1. This polymer was then cryogenically ground and prepared as 25 wt % polymer suspensions in an isooctyl alcohol/propylene glycol mix. The resulting polymer suspensions were then tested according to the following Cold Shear-Warm Filtration test:

Sample Preparation:

A supply of diesel was cooled to between 36 to 42° F. Approximately 1400 grams of cold diesel were poured into a 2-liter wide-mouth bottle, capped and kept between 36 and 42° F. A 0.0475 grams +/−0.0005 grams sample of the suspension was weighed out into a small plastic container using a 4-place balance.

The suspension sample was then added to the 2-liter bottles of cold diesel as follows by holding the small container of test sample above the bottle and spraying a small stream of hexane from a squeeze bottle to flush the test sample into the bottle. The test sample was flushed as quickly as was practicable. The 2-liter bottle was immediately recapped and was shaken vigorously for approximately 30 seconds. The 2-liter bottle was loaded onto a rolling apparatus, while maintained in the cold environment. The 2-liter bottle was rolled at approximately 100 rpm for about 16 hours.

Cold Shearing:

The 2-liter bottle was removed from the rolling apparatus. The following was accomplished in the cold environment. Two approximately 180 gram samples were poured into two plastic 250-ml cups. Each cup sample was sheared for 60 seconds using a Moulinex high-speed hand blender. The cup samples were covered and set aside.

Filtration Testing:

The cup samples were removed to an ambient lab and heated in a shaker bath set to heat to approximately 100° F. The bath lid was closed and the shaker table set to stationary. The samples were allowed to heat for approximately 30 minutes. The cup samples were then removed from the bath and allowed to cool to ambient temperature. Each of the cup samples was filtered through a fresh 5-micron, 25 mm SMWP Millipore filter utilizing a laboratory vacuum pump and vacuum filter flask. A stopwatch was used to time each filtration and the times recorded.

The process above was repeated for samples made according to Example 1, as well as for traditional drag-reducing polymers. Results of the tests are shown in Table 1.

TABLE 1

Cold Shear–Warm Filtration Test Results

| Suspension Number | Polymer Composition | 60 Second Shearing Warm Filtration Time (seconds)[1] |
|---|---|---|
| 1 | 4% Styrene/ 48% Octene/ 48% Decene | 23.5 |
| 2 | 5% Styrene/ 95% Octene | 23.8 |
| 3 | 90% Octene/ 10% Decene | 25.9 |
| 4 | 70% Octene/ 30% Decene | 20.9 |
| 5 | 4% Styrene/ 32% Hexene/ 64% Dodecene | 51.2 |
| 6 | 10% Styrene/ 45% Octene/ 45% Tetradecene | 61.2 |
| 7 | 65% Hexene/ 35% Dodecene | 94.1 |
| 8 | 100% Decene | 109.0 |

TABLE 1-continued

Cold Shear–Warm Filtration Test Results

| Suspension Number | Polymer Composition | 60 Second Shearing Warm Filtration Time (seconds)[1] |
|---|---|---|
| 9 | 50% Hexene/ 50% Dodecene | 113.4 |

[1]Warm filtration times for untreated diesel samples typically run from about 20 to 26 seconds.

Polymer suspensions 5 through 9 showed filter times substantially higher than that for untreated diesel tested in a similar manner. These polymers show significant levels of reluctant fraction. Polymer suspensions 1 through 4 showed filter times nearly the same as the untreated diesel. These polymers show no reluctant fraction.

EXAMPLE 4

Copolymer suspensions were prepared in a manner similar to Example 3. A portion of each copolymer suspension was subjected to cold temperatures for a 6-day period. Following this period of cold temperatures, the chilled suspensions were allowed to warm up to ambient temperature and then were tested according to the Cold Shear-Warm Filtration test along with their non-chilled counterparts. The results of these tests are shown in Table 2:

TABLE 2

Suspension Cold Soak at 38° F. for 6 Days
Cold Shear–Warm Filtration Test Results

| Suspension Number | Polymer Composition | 60 Second Shearing Warm Filtration Time (seconds)[1] |
|---|---|---|
| 10 | 90% Octene/ 10% Decene | 22.4 |
| 11 | 70% Octene/ 30% Decene | 20.9 |
| 12 | 100% Decene | 361.5 |
| 13 | 50% Hexene/ 50% Dodecene | 499.0 |

[1]Warm filtration times for untreated diesel samples typically run from about 20 to 26 seconds.

As shown in Table 2, for polymers outside the teachings of this invention, as typified by suspensions 12 and 13, the 6-day chill period increased the level of reluctant fraction. However, copolymers made according to the present invention, such as those used in making suspensions 10 and 11, did not show any reluctant fraction, even after the 6-day chill period.

The catalyst, monomers, promoter, activator, liquid refrigerant, suspending fluid, suspension stabilizer, glycol, wetting agent, anti-foaming agent, and thickener, should be combined in effective amounts to accomplish the results desired and to avoid hazardous operating conditions. These amounts will vary depending on individual process conditions and can be determined by one of ordinary skill in the art. Also, where temperatures and pressures are indicated, those given are a guide to the most reasonable and best conditions presently known for those processes, but temperatures and pressures outside of those ranges can be used within the scope of this invention. The range of values expressed as between two values is intended to include the value stated in the range.

What is claimed is:

1. An ultra-high molecular weight copolymer useful as a drag reducer for hydrocarbons having a molecular weight greater than 1 million and substantially no reluctant fraction comprising a majority of alpha-olefin monomers with carbon chain lengths of between 4 and 9 carbons (molar content) and less than 25% monomers (molar content) with carbon chain lengths of 12 or longer.

2. The copolymer of claim 1 wherein the ultra-high molecular weight copolymer comprises less than 15% monomers (molar content) with carbon chain lengths of 12 or longer.

3. The copolymer of claim 1 wherein the copolymer comprises
   a) a first monomer, the first monomer comprising an alpha-olefin monomer having a carbon chain length of between 4 and 9 carbon atoms; and
   b) a second monomer, the second monomer comprising an alpha-olefin monomer having a carbon chain length of between 2 and 20 carbon atoms or comprising a vinyl aromatic monomer, the second monomer being different from the first monomer.

4. The copolymer of claim 3, wherein the vinyl aromatic monomer comprises styrene, an alkyl-styrene with an alkyl group having between 1 and 18 carbon atoms, a vinyl naphthalene, a vinyl alkylnaphthalene with an alkyl group having between 1 and 18 carbon atoms or combinations thereof.

5. The copolymer of claim 1 wherein the copolymer comprises
   a) a first monomer, the first monomer comprising an alpha-olefin monomer having a carbon chain length of between 4 and 9 carbon atoms; and
   b) a second monomer, the second monomer comprising an alpha-olefin monomer having a carbon chain length of between 2 and 20 carbon atoms or comprising a vinyl aromatic monomer, the second monomer being different from the first monomer; and,
   c) a third monomer, the third monomer comprising an alpha-olefin monomer having a carbon chain length of between 2 and 11 carbon atoms or comprising a vinyl aromatic monomer, the third monomer being different from the first and second monomers.

6. The copolymer of claim 5, wherein the vinyl aromatic monomer comprises styrene, an alkyl-styrene with an alkyl group having between 1 and 18 carbon atoms, a vinyl naphthalene, a vinyl alkylnaphthalene with an alkyl group having between 1 and 18 carbon atoms or combinations thereof.

7. A method of manufacturing an ultra-high molecular weight copolymer useful as a drag reducer comprising:
   (a) bulk-polymerizing, in the absence of a solvent, a monomer mixture comprising a majority of alpha-olefin monomers with carbon chain lengths of between 4 and 9 carbons (molar content) and less than 25% monomers (molar content) with carbon chain lengths of 12 or longer; and
   (b) forming the ultra-high molecular weight copolymer, wherein the ultra-high molecular weight copolymer has a molecular weight of greater than 1 million and substantially no reluctant fraction.

8. The method of claim 7 wherein the ultra-high molecular weight copolymer comprises less than 15% monomers (molar content) with carbon chain lengths of 12 or longer.

9. The method of claim 7 wherein the monomer mixture comprises:

(a) a first monomer, the first monomer comprising an alpha-olefin monomer having a carbon chain length of between 4 and 9 carbon atoms; and (b) a second monomer, the second monomer comprising an alpha-olefin monomer having a carbon chain length of between 2 and 20 carbon atoms or comprising a vinyl aromatic monomer, the second monomer being different from the first monomer.

10. The method of claim 9, wherein the vinyl aromatic monomer comprises styrene, an alkyl-styrene with an alkyl group having between 1 and 18 carbon atoms, a vinyl naphthalene, a vinyl alkylnaphthalene with an alkyl group having between 1 and 18 carbon atoms or combinations thereof.

11. The method of claim 7 wherein the monomer mixture comprises:

a) a first monomer, the first monomer comprising an alpha-olefin monomer having a carbon chain length of between 4 and 9 carbon atoms;

b) a second monomer, the second monomer comprising an alpha-olefin monomer having a carbon chain length of between 2 and 20 carbon atoms or comprising a vinyl aromatic monomer, the second monomer being different from the first monomer; and, c) a third monomer, the third monomer comprising an alpha-olefin monomer having a carbon chain length of between 2 and 11 carbon atoms or comprising a vinyl aromatic monomer, the third monomer being different from the first and second monomers.

12. The method of claim 7 wherein the vinyl aromatic monomer comprises styrene, an alkyl-styrene with an alkyl group having between 1 and 18 carbon atoms, a vinyl naphthalene, a vinyl alkylnaphthalene with an alkyl group having between 1 and 18 carbon atoms or combinations thereof.

13. The method of claim 7 wherein the monomer mixture further comprises an initiator, a catalyst and a promoter.

14. A method for the preparation of a drag-reducing copolymer suspension comprising:

a) preparing an ultra-high molecular weight copolymer by bulk co-polymerizing monomer mixture comprising a majority of alpha-olefin monomers with carbon chain lengths of between 4 and 9 carbons (molar content) and less than 25% monomers (molar content) with carbon chain lengths of 12 or longer, wherein the ultra-high molecular weight copolymer has a molecular weight of greater than 1 million and substantially no reluctant fraction; and, b) mixing the ultra-high molecular weight copolymer with a suspending fluid to form the drag-reducing polymer suspension.

15. The method of claim 14, further comprising, between step a) and step b) the step of:

grinding the ultra-high molecular weight copolymer at a temperature below the glass-transition temperature of the ultra-high molecular weight copolymer to form ground polymer particles.

16. The method of claim 14, wherein the step of preparing the ultra-high molecular weight copolymer further comprises:

mixing the monomer mixture with an initiator, a promoter or both; and mixing the monomer mixture with a catalyst.

17. The method of claim 14 wherein the ultra-high molecular weight copolymer comprises less than 15% monomers (molar content) with carbon chain lengths of 12 or longer.

18. The method of claim 14, wherein the suspending fluid further comprises a wetting agent, an antifoaming agent, a thickening agent or combinations thereof.

19. The method of claim 14 wherein the monomer mixture comprises:

(a) a first monomer, the first monomer comprising an alpha-olefin monomer having a carbon chain length of between 4 and 9 carbon atoms; and (b) a second monomer, the second monomer comprising an alpha-olefin monomer having a carbon chain length of between 2 and 20 carbon atoms or comprising a vinyl aromatic monomer, the second monomer being different from the first monomer.

20. The method of claim 14 wherein the monomer mixture comprises:

a) a first monomer, the first monomer comprising an alpha-olefin monomer having a carbon chain length of between 4 and 9 carbon atoms;

b) a second monomer, the second monomer comprising an alpha-olefin monomer having a carbon chain length of between 2 and 20 carbon atoms or comprising a vinyl aromatic monomer, the second monomer being different from the first monomer; and, c) a third monomer, the third monomer comprising an alpha-olefin monomer having a carbon chain length of between 2 and 11 carbon atoms or comprising a vinyl aromatic monomer, the third monomer being different from the first and second monomers.

21. A method for the preparation of a drag-reducing copolymer suspension comprising:

a) preparing an ultra-high molecular weight copolymer by solution co-polymerizing in a hydrocarbon solvent a monomer mixture comprising a majority of alpha-olefin monomers with carbon chain lengths of between 4 and 9 carbons (molar content) and less than 25% monomers (molar content) with carbon chain lengths of 12 or longer, wherein the ultra-high molecular weight copolymer has a molecular weight of greater than 1 million and substantially no reluctant fraction;

b) separating the ultra-high molecular weight copolymer from the hydrocarbon solvent; and, c) mixing the ultra-high molecular weight copolymer with a suspending fluid to form the drag-reducing polymer suspension.

22. The method of claim 21, further comprising, between step (b) and step (c), the step of:

grinding the ultra-high molecular weight copolymer at a temperature below the glass-transition temperature of the ultra-high molecular weight copolymer to form ground polymer particles.

23. The method of claim 21, wherein the step of preparing the ultra-high molecular weight copolymer further comprises:

mixing the monomer mixture with an initiator, a promoter or both; and mixing the monomer mixture with a catalyst.

24. The method of claim 21 wherein the ultra-high molecular weight copolymer comprises less than 15% monomers (molar content) with carbon chain lengths of 12 or longer.

25. The method of claim 21, wherein the suspending fluid further comprises a wetting agent, an antifoaming agent, a thickening agent or combinations thereof.

26. The method of claim 21 wherein the monomer mixture comprises:

(a) a first monomer, the first monomer comprising an alpha-olefin monomer having a carbon chain length of between 4 and 9 carbon atoms; and (b) a second monomer, the second monomer comprising an alpha-olefin monomer having a carbon chain length of between 2 and 20 carbon atoms or comprising a vinyl aromatic monomer, the second monomer being different from the first monomer.

27. The method of claim 21 wherein the monomer mixture comprises:

a) a first monomer, the first monomer comprising an alpha-olefin monomer having a carbon chain length of between 4 and 9 carbon atoms;

b) a second monomer, the second monomer comprising an alpha-olefin monomer having a carbon chain length of between 2 and 20 carbon atoms or comprising a vinyl aromatic monomer, the second monomer being different from the first monomer; and, c) a third monomer, the third monomer comprising an alpha-olefin monomer having a carbon chain length of between 2 and 11 carbon atoms or comprising a vinyl aromatic monomer, the third monomer being different from the first and second monomers.

28. The method of claim 21, wherein step (b) further comprises:

precipitating the ultra-high molecular weight copolymer with a non-solvent.

29. The method of claim 28, wherein step (b) further comprises, after the step of precipitating:

drying the ultra-high molecular weight copolymer.

30. The method of claim 28, wherein step (b) further comprises:

extracting the hydrocarbon solvent and unreacted monomer into the non-solvent.

* * * * *